Patented Feb. 12, 1946

2,394,683

UNITED STATES PATENT OFFICE 2,394,683

POISONING COMPOSITION AND METHOD

Ira L. Griffin and Caddis F. Morriss, Charlotte, N. C.

No Drawing. Application May 16, 1944, Serial No. 535,876

4 Claims. (Cl. 167—15)

This invention relates to an insecticide for use on plants, trees and other forms of vegetable growth. It is especially suitable for application to growing plants such as the cotton plant, for killing the well known "boll weevil."

Heretofore, the most commonly used insecticide or poison for boll weevils has been a liquid composition containing one gallon of cane molasses, e. g. black strap molasses, one gallon of water, and one pound of calcium arsenate. This composition is applied to the cotton leaves and other parts of the plant by a well known mopping operation, and has proven effective for restraining wide spread infestation and damage by the weevils to the cotton bolls. The relatively high cost of the molasses constituent of this composition and the limit to which it can be diluted with water have restricted extensive use of the product. Many farmers who would like to use the product for boll weevil poisoning have not done so because of this economic problem.

In accordance with the present invention we have produced a poisoning composition that may be diluted with water to a markedly great extent, not previously possible, and have thereby materially lessened the cost of the product. This long desired improvement has been made possible by a combination of a poisonous constituent, e. g. calcium arsenate, and a new sirup constituent obtained from citrus fruit. This sirup is identified hereinafter as "citrus sirup."

We have found that a combination of citrus sirup and calcium arsenate produces a surprising thickening of the solution or mixture of these two constituents. The principal benefit of this action is that it enables dilution of the composition with relatively very large amounts of water. For example, the usual 1-1-1 mixture of cane molasses, water and calcium arsenate described above, may be substituted by our new 1-7-4 composition containing one gallon of citrus sirup, seven gallons of water and four pounds of calcium arsenate. The amount of calcium arsenate in this composition is the same per gallon as in the conventional 1-1-1 mixture.

In the above specific but non-limiting example we have increased the water content by seven times the heretofore permitted amount, and without any adverse change in the desired viscosity and other properties of the usual composition. In this composition, one gallon of citrus sirup mixed with seven gallons of water produces eight gallons of mopping mixture, as compared with the one gallon of black strap molasses and one gallon of water which produces two gallons of the usual mopping mixture. Therefore, the mopping mixture of the present invention, from the standpoint of total volume, is four times as great as the usual 1-1-1 mopping mixture and will serve four times the usual plant acreage.

The net materials cost of the mopping mixture of this invention is approximately one third the cost of the usual 1-1-1 mixture, and the labor and shipping costs are also substantially less, since only about one fourth of the volume of mopping mixture, before diluting with water, is required for handling and shipment.

The citrus sirup which is used in the composition of this invention is obtained commercially as a by product of the citrus fruit canning industry, in which the fruit, e. g. oranges, grapefruit and tangerines, are squeezed or pulped to obtain the juice or quartered-fruit for canning. The remaining hulls or rinds are pressed to remove the natural juices which are then concentrated by heating, usually in the well known vacuum pans, until the normally thin juices are converted into a relatively viscous sirup of desired consistency. This final sirup is the product that is useful in the present invention and is identified herein as citrus sirup. It is sometimes referred to in railroad tariffs as—citrus pomace final sirup.

An approximate analysis of a typical citrus sirup which may be used in accordance with this invention is as follows:

| | |
|---|---|
| Moisture | 33.31 |
| Total solids | 66.69 |
| Specific gravity | 1.329 |
| Crude fat | 0.15 |
| Crude protein | 5.00 |
| Crude fiber | 0.00 |
| Ash | 3.57 |
| N. free ext | 57.97 |
| Reducing sugars as invert | 20.92 |
| Non-reducing as sucrose | 19.87 |
| Wt. per gal. in lbs | 11.07 |

To illustrate the thickening property of the citrus sirup-calcium arsenate mixture and the resulting effect on the viscosity of the complete poisoning composition, in contrast to the usual cane molasses composition, the following data are given:

| | Ostwald viscosity at 77° F. before adding calcium arsenate | Ostwald viscosity at 77° F. after adding calcium arsenate |
|---|---|---|
| Blackstrap cane molasses mixture containing 1 gal. of molasses and 1 gal. of water. | 27 secs., 6.5 centistokes. | 41 secs., 9.8 centistokes. |
| Citrus sirup mixture containing 1 gal. of sirup and 7 gals. of water. | 7 secs., 1.6 centistokes. | 169 secs., 40.5 centistokes. |

As shown in the above table the citrus sirup may be diluted with water to a viscosity of about one-fourth that of the black strap molasses, and this very diluted solution will, nevertheless, so greatly increase in viscosity when brought into coaction or interaction with the calcium arsenate, that the resulting composition will have a viscosity of more than four times the viscosity of the black strap molasses composition. This is equivalent to an overall increase in viscosity in the citrus sirup composition of over 2300%. It is primarily this tremendous increase in viscosity that enables the composition of this invention to be utilized in greatly diluted form and still maintain adequate viscosity for mopping purposes. As a matter of fact, when this composition is diluted with seven gallons of water instead of the usual one gallon of water, the viscosity of the composition is not only equivalent to the viscosity of the usual cane molasses composition diluted with one gallon of water, but is, in fact, about five times more viscous than the cane molasses composition even after the extensive dilution. Accordingly, even more dilute compositions than that of the above 1-7-4 formula may be used if desired.

In the preparation of our composition the citrus sirup is diluted with the desired amount of water and the calcium arsenate, in the necessary quantities for effective poisoning for this volume of composition, is then incorporated. The calcium arsenate may be added before shipment of the citrus sirup solution to the farmer or it may be added by him at the time of use of the composition. Also, the calcium arsenate may be added to the concentrated, undiluted citrus sirup and this mixture shipped to the farmer or other user who would simply dilute to the desired viscosity before use on the plants. Furthermore, if desired, the citrus sirup may be concentrated beyond the usual sirupy stage and to a more or less solid or semi-solid form and the calcium arsenate added thereto. This procedure would provide a minimum weight for shipment of the composition, which would be completed at the point of use by addition of the required amount of water.

It is desirable to permit any freshly prepared composition containing the citrus sirup and calcium arsenate to sit for a period of time, such as for example a couple of hours, before using as a mopping mixture. This time delay permits the sirup and calicum arsenate to coact or react, whichever may be the case, and produce thereby the maximum desired thickening before use.

It will be understood from the foregoing description that the calcium arsenate may be substituted by an equivalent insecticide material so long as the selected material will coact or react with the citrus molasses to give this desirable thickening effect and increase in viscosities and thereby permit the extensive dilution of the composition in accordance with the spirit of this invention. Likewise, modifications of the citrus sirup described hereinabove may be substituted and used in the process and product of this invention so long as the substituted material will coact or react with the calcium arsenate to produce the effects described just above. These and similar equivalent chemicals and materials are contemplated within the scope of this invention as defined in the appended claims.

We claim:

1. An insecticide composition comprising citrus sirup and calcium arsenate.

2. An insecticide liquid composition comprising citrus sirup, water and calcium arsenate in which the water is present in substantially greater quantities than the volume of citrus sirup.

3. An insecticide liquid composition comprising citrus sirup, calcium arsenate, and water in the ratio of approximately one part by volume of sirup, seven parts by volume of water, and four parts by weight of calcium arsenate.

4. A method of making an insecticide composition suitable for mopping plants comprising mixing citrus sirup and calcium arsenate in an aqueous medium and coacting said sirup and arsenate to provide a substantial thickening of the mixture such that the composition may be diluted with water of a volume several times greater than the volume of the citrus sirup.

IRA L. GRIFFIN.
CADDIS F. MORRISS.